United States Patent
Wittenstein et al.

(10) Patent No.: US 6,777,834 B2
(45) Date of Patent: Aug. 17, 2004

(54) LIFT/SWIVEL DRIVE

(75) Inventors: Manfred Wittenstein, Bad Mergentheim (DE); Thomas Bayer, Igersheim (DE)

(73) Assignee: Wittenstein GmbH & Co. KG, Igersheim (DE)

( * ) Notice: Subject to any disclaimer, the term of this patent is extended or adjusted under 35 U.S.C. 154(b) by 0 days.

(21) Appl. No.: 10/296,076

(22) PCT Filed: Jan. 13, 2001

(86) PCT No.: PCT/EP01/00370
§ 371 (c)(1),
(2), (4) Date: May 16, 2003

(87) PCT Pub. No.: WO01/89772
PCT Pub. Date: Nov. 29, 2001

(65) Prior Publication Data
US 2003/0172764 A1 Sep. 18, 2003

(30) Foreign Application Priority Data
May 23, 2000 (DE) ......................... 100 25 351

(51) Int. Cl.$^7$ .............................................. H02K 41/00
(52) U.S. Cl. ...................................................... 310/12
(58) Field of Search ...................................... 310/12, 20

(56) References Cited

U.S. PATENT DOCUMENTS 5,446,323 A * 8/1995 Neff et al. .................... 310/12

* cited by examiner

Primary Examiner—Burton S. Mullins
Assistant Examiner—Judson H. Jones
(74) Attorney, Agent, or Firm—Bachman & LaPointe, P.C.

(57) ABSTRACT

A lift/swivel drive comprising a working element which can traverse rotationally and linearly in relation to a housing element. In order to displace the working element in a controllable linear and rotative manner in relation to the housing element, at least one linear motor and at least one rotative motor are assigned to the working element and/or the housing element.

9 Claims, 3 Drawing Sheets

LIFT/SWIVEL DRIVE

BACKGROUND OF THE INVENTION

The present invention relates to a lifting/swiveling drive having a working element which can move rotatably and linearly relative to a housing element.

Lifting/swiveling drives of this type are known commercially and are customary in diverse forms and designs. They are used in different spheres essentially for carrying out an entirely determined lifting movement, for example of a tool, with a simultaneous or subsequent rotational movement in order to process a certain workpiece or, for example, to pick up a certain object and to deposit it at another location.

In the case of conventional lifting/swiveling drives, use is made, for example, of disk cam mechanisms which are subject to a high degree of wear and are thereby imprecise.

Furthermore, lifting/swiveling drives of this type are very slow in operation and can therefore only be used to a limited extent during production. For example, lifting/swiveling drives of this type are used in the production of compact disks (CDs) which, in order for the plastic carrier to be coated, have to be inserted into a corresponding device for this purpose. It should be possible for this insertion to take place very exactly, precisely and very rapidly. Manufacturing devices of this type are in operation 24 hours a day and require long service lives at high velocities. The precision is considerably impaired by wear, which is disadvantageous. The consequence of higher velocities is a higher degree of wear and a higher breakdown rate, which is undesirable.

Furthermore, lifting/swiveling drives of this type can be used, for example, as "wafer handling" in the semiconductor industry.

DE 29 06 404 describes an electric motor which comprises stator and rotor parts together with bearing points. In this case, an armature and an induction motor as armature for a linear motor are arranged one behind the other on a common shaft. An induction motor part is provided as a synchronous motor with permanent induction armatures which are controlled with the aid of a sensor.

U.S. Pat. No. 5,952,744 discloses a lifting/swiveling drive having two independent coils for the rotative and linear driving of an actuating element. The measurement of the rotational movement, in particular of the swiveling movement, takes place in an optical manner by means of optical sensing elements.

According to U.S. Pat. No. 5,600,189, an electromagnetically operated actuator is described, in which a rotational movement takes place electromagnetically and a sliding movement takes place hydraulically. The measurement of the rotational movement takes place via a reference measurement of different signals, which is imprecise.

The present invention is based on the object of providing a lifting/swiveling drive of the type mentioned at the beginning which eliminates the above-mentioned disadvantages and with which, in particular, the precision, the velocities and accelerations of rotative and linear type are to be increased considerably accompanied by longer service lives.

Furthermore, a control of the linear and rotative movement of the working element is to be possible in a highly precise and exact manner.

This object is achieved in that in order for the working element to move in a controllable, linear and rotative manner relative to the housing element, at least one linear motor and at least one rotative motor are assigned to the working element and/or the housing element.

SUMMARY OF THE INVENTION

This object is achieved by the features of the present invention wherein a linear motor and a rotative motor are arranged spaced apart radially from each other in the housing element. The stators thereof are connected firmly and fixedly to the housing element and, in particular, to its inner cylinder wall. The housing element is preferably of cylindrical design and the working element is mounted in a linearly moveable and rotatable manner in it.

In the region of the linear motor and of the rotative motor, magnets are arranged on the outside of the working element, on the circumferential surface thereof, in a manner such that they at least partially encircle it radially. In this case, linear motor and rotative motor are in contactless connection with the respective magnets, in particular permanent magnets, of the working element.

The magnets are of a radial length which is greater than a length or an effective region of the rotative motor or of the linear motor.

This enables the working element to rotate in a contactless manner and independently either about a central axis as desired and also in any desired independent numbers of revolutions and at the same time to move linearly to and fro independently of this movement.

This enables any desired tool adjoining the working element to move exactly to a desired location, in particular by means of the exact control of the linear and rotatively independent movement. The lifting movement and the swiveling movement can be activated independently of each other and, in particular, can be programmed. The same applies for the parameters of linear lift and rotational angle, linear acceleration and velocity and angular velocity and angular acceleration.

By means of the arrangement of the linear motors and of the rotative motors in the cylinder wall of the housing element, the greatest masses remain in the housing element. By this means, the working element is of very lightweight design and can therefore absorb relatively large accelerations and velocities and angular velocities. Furthermore, a system of this type operates in a virtually wear-free manner, since only the bearings, preferably designed as sliding bearings or as rolling contact bearings or as a combination of both bearings, are in engagement between housing element and working element.

It has proven particularly advantageous for the working element to be adjoined on the end side by a measuring device via a bearing element which sits in a sleeve-like manner on the working element.

The bearing element decouples a rotative movement between working element and measuring device, with the result that the latter is coupled only linearly to the working element. For this purpose, the measuring device is guided linearly, if appropriate via a guide element, so that a rotative movement of the measuring device is decoupled.

The linear movement of the measuring device can be read exactly via highly precise linear sensors, which are preferably assigned to the housing element on the inside and interact with, for example, magnetic strips of a measuring device, and by this means the path which is to be covered or has been covered and the linear acceleration and velocity can be determined exactly and highly precisely and controlled via the linear motor.

At the same time, by means of the rotative fixing of the measuring device relative to the working element by two rotation sensors spaced apart in a contactless manner with respect to each other on, on the one hand, the measuring device and, on the other hand, the working element, an exact determination of the rotational angle, of the number of revolutions, of the angular velocity and of the angular acceleration is possible. By this means, any desired angle or any desired number of revolutions can be read exactly and highly precisely controlled and programmed with the aid of the rotative motor.

By supporting the measuring device by means of at least one spring element relative to a base of a housing element, the dead weight of the working element can, in particular, be balanced and, if appropriate, if the current should fail damage to the working element falling downwards towards the base of the housing element can be prevented. The reduction in the dead weight enables the working element to move substantially more rapidly and more easily. Higher loads can be picked up or the dead weight and the size or the power of the linear motor can be reduced.

Furthermore, it is advantageous in the case of the present invention that the linear motor and rotative motor can be activated and supplied with power via the housing element via fixed, immobile connecting lines. The same applies to the linear sensor and to the rotative sensor.

All of the connections to the working element take place in a contactless manner without direct supply of power by means of cables, lines or the like.

This increases the service life of lifting/swiveling drives of this type, in particular. It is furthermore advantageous that the working element, which is designed, for example, as a hollow shaft, can be used in order to pass compressed air or negative pressure into a tool or a similar working device connected thereto. Lines of this type may correspondingly also be passed through, should this be desirable.

BRIEF DESCRIPTION OF THE DRAWINGS

Further advantages, features and details of the invention emerge from the following description of preferred exemplary embodiments and with reference to the drawing, in which.

DETAILED DESCRIPTION

Figure 1:
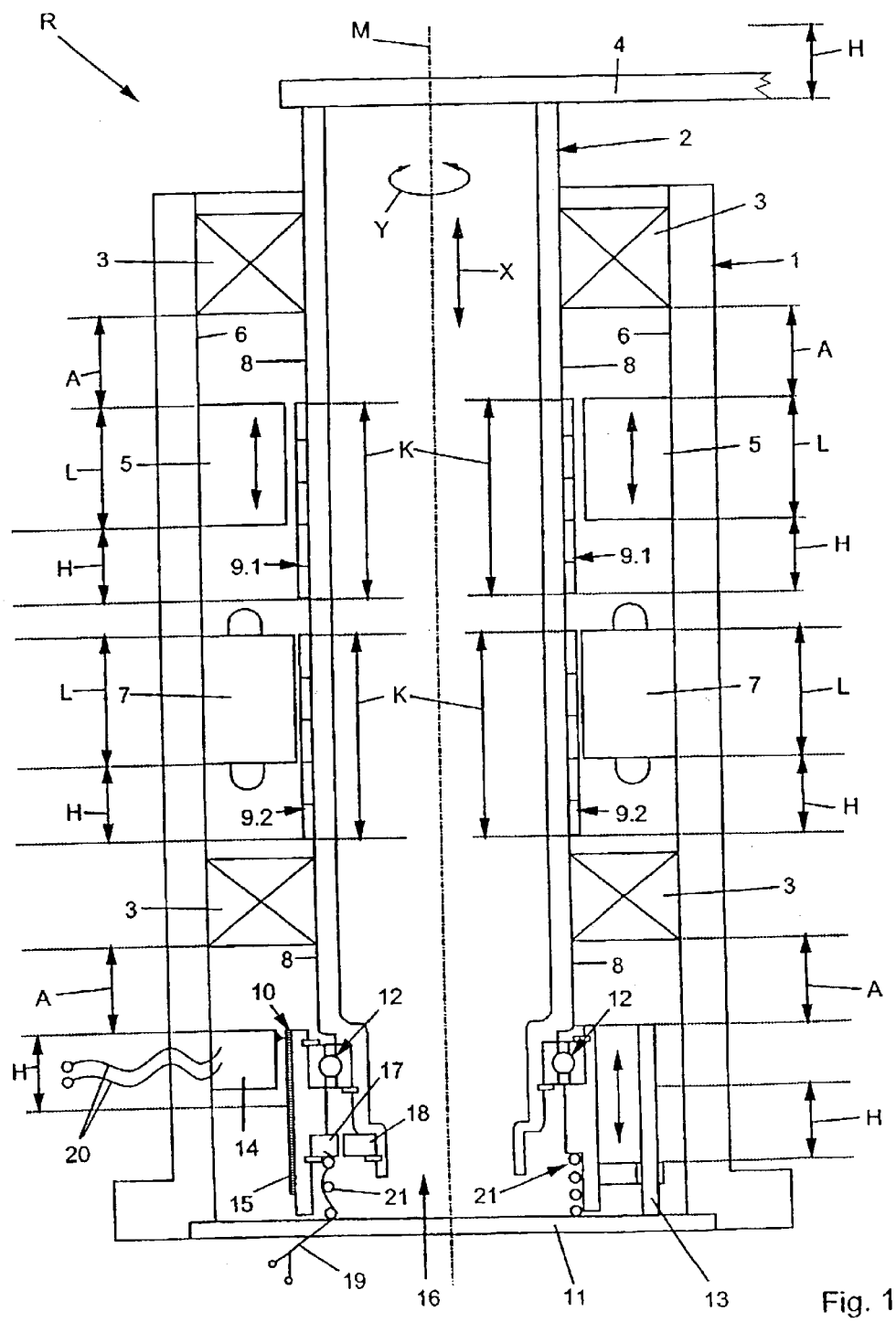
FIG. 1 shows a schematically illustrated longitudinal section through a lifting/swiveling drive according to the invention in an operative position.

According to FIG. 1, a lifting/swiveling drive R according to the invention has a housing element 1 which is preferably of cylindrical design. A working element 2, which is of cylindrical design, is inserted in a manner such that it is movable coaxially therein in a linear manner in the double arrow direction X which is illustrated and such that it can rotate about a central axis M in the double arrow direction Y which is illustrated. Preferably two spaced apart bearings 3, which are designed, for example, as sliding bearings or the like, mount the working element 2 in the housing element 1 in a precise, exactly fitting and virtually play-free manner.

At one end the working element 2 is adjoined by any desired tool 4, arm, gripper, gripping device or the like which, by means of the linear movement in the double arrow direction X, experiences a lift H and, by means of a rotative rotational movement of the working element 2, approaches a certain location, for example for gripping, picking up, depositing and machining workpieces or the like.

In the case of the present invention, the working element 2 is arranged in a manner such that it can rotate about the central axis M as often as desired irrespective of an angle of rotation.

It has proven advantageous in the present invention, for the linear movement of the working element 2, to insert a linear motor 5 in an at least partially encircling manner into an inner cylinder wall 6 of the housing element 1 and to fix it there. In this case, the linear motor 5 can be arranged in a radially encircling manner on the inside in the cylinder wall 6 of the housing element 1.

A rotative motor 7 which is arranged in an at least partially encircling manner and only rotatively drives the working element 2 is provided in the housing element 1, in particular in the region of the cylinder wall 6, spaced apart from the linear motor 5. The linear motor 5 and the rotative motor 7 are arranged as stators spaced apart axially from each other in the housing element 1 and fixed to the cylinder wall 6 of the housing element 1.

The scope of the present invention is to include arranging a plurality of linear motors 5 and rotative motors 7 in each case radially within the cylinder wall 6, at different levels, if appropriate.

Furthermore, in the region of the linear motors 5 and rotative motors 7 cooling ribs or the like (not illustrated here) can be assigned to the outside of the housing element 1, in order to conduct away heat.

Linear motor 5 and rotative motor 7 preferably lie spaced apart axially from each other between the bearings 3 in the housing element 1. In this case, the linear motor 5 is spaced apart at a distance A from the bearing 3 on the one hand, and from the adjacent, rotative motor 7, on the other hand. This distance A is equal to or larger than a maximum lift H of the working element 2.

For the linear movement, in the region of the linear motor 5 a magnet 9.1, in particular a permanent magnet, is assigned to an outer circumferential surface 8 of the working element 2 and is spaced apart from the linear motor 5 in a contactless manner and close to it. The magnet 9.1 is preferably arranged completely over the circumferential surface and radially around the entire circumference of the working element 2 as a permanent magnet. In this case, a radial length K of the magnet 9.1 is larger than a length L of the range of effectiveness of the linear motor 5.

The same applies for the rotative motor 7 and its assigned magnet 9.2 on the working element 2, which magnet runs in the above-described manner radially around the circumferential surface 8 of the working element 2.

The radial length K of the magnets 9.1, 9.2 is designed to be larger than the range of effectiveness or than a length L of linear motor 5 and rotative motor 7.

A maximum lift H is produced from the radial length K of the magnets 9.1, 9.2 minus the length L of linear motor 5 and rotative motor 7.

By means of the linear motor 5, the working element 2 can move linearly to and fro, accelerate or traverse in a contactless manner, in particular inductively, in interaction with the magnet 9.1 in the double arrow direction X illustrated, irrespective of a rotative movement or position of the working element 2.

In this case, an exactly defined path can be covered at an exactly defined, controllable and determinable time, acceleration and velocity by means of the linear motor 5. This linear movement is independent of an entirely determined rotational movement about the central axis M.

The rotational movement takes place by means of the rotative motor 7 which is in engagement with or inductively interacts with the magnets 9.2 of the working element 2. The rotative movement of the working element 2 takes place at independent rotational velocities, rotational accelerations and rotational angles, it being possible for the working element to rotate about the central axis M irrespective of an angle, for example to and fro as often as desired in the double arrow direction Y which is illustrated or as often as desired in one direction or the other about said central axis. An important feature in the present invention is that the linear movement of the working element 2 relative to the linear motor 5 takes place independently of a rotational movement of the working element 2 by means of the rotative motor 7. The rotative and the linear driving movements of the working element 2 can be regulated and controlled completely independently of each other.

Furthermore, it is advantageous in the present invention that the magnets 9.1, 9.2, which are arranged spaced apart axially from each other on the circumferential surface 8 of the working element 2 and are intended for the linear motor 5 and for the rotative motor 7, have a relatively low dead weight in relation to the linear motor 5 and the rotative motor 7.

By this means, the working element 2 can be of very lightweight design and can therefore execute very great accelerations and can also absorb relatively large loads or forces.

Furthermore, it is advantageous that the linear motor 5 and also the rotative motor 7 are supplied with power via the outer housing element 1 and, in this connection, can also be controlled externally via connecting lines (not illustrated) which are not moved.

Figure 2:
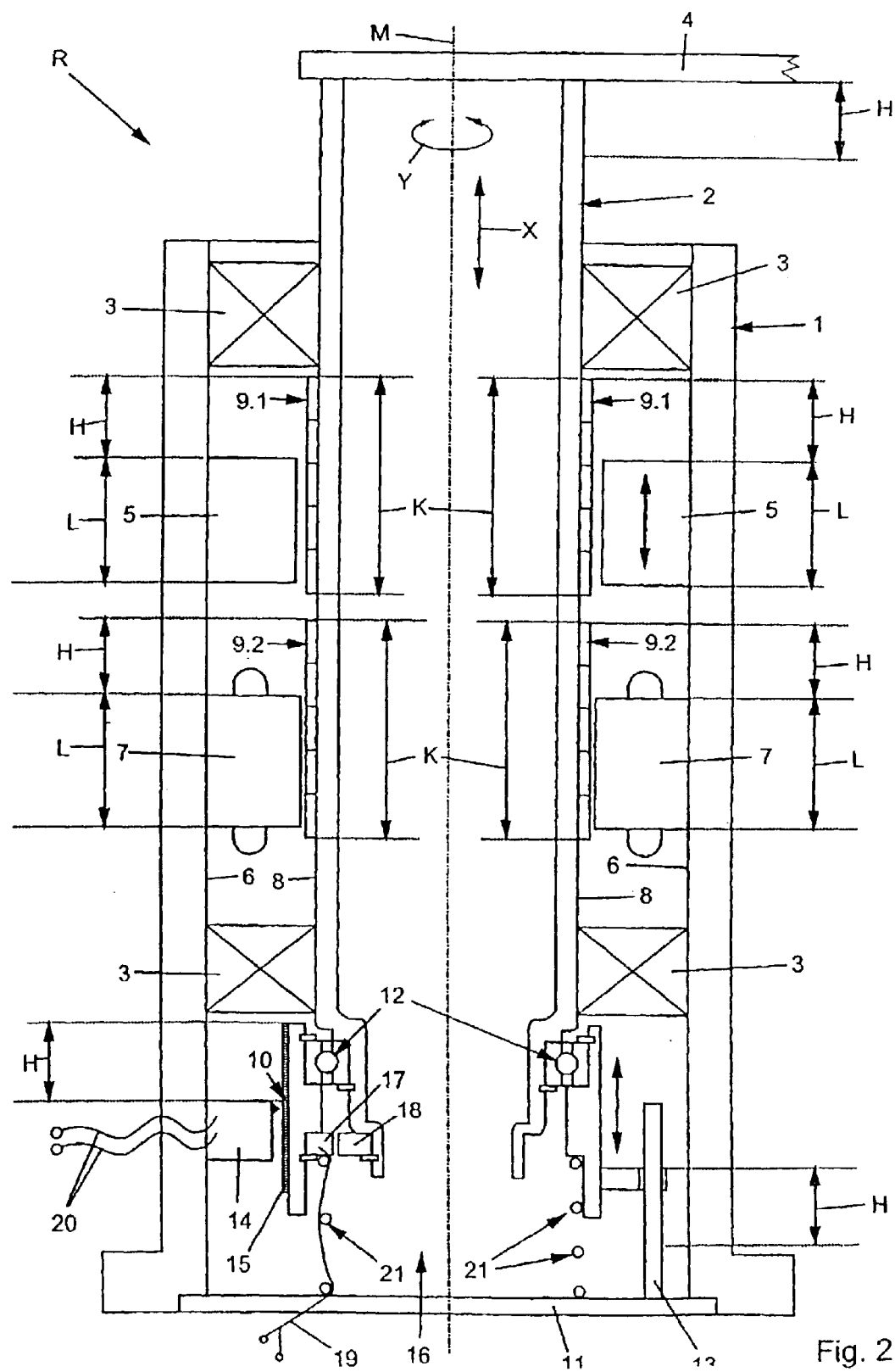
FIG. 2 shows a schematically illustrated longitudinal section through the lifting/swiveling drive according to FIG. 1 in a further operative position.

FIG. 2 illustrates the manner in which the working element 2 is extended out of the housing element 1 by the lift H, the linear movement by the lift H being possible by means of the rotative motor 7 independently of a permanent or sequential, rotative movement of the working element 2.

In order for an extremely precise and exact control of the rotative and the linear movement of the working element 2 to be possible, a measuring device 10 adjoins the end side of the working element 2 in the vicinity of a base 11 of the housing element 1.

The particular feature of the measuring device 10 is that the latter is connected to the working element 2 via a bearing element 12. The measuring device 10 preferably grips in a sleeve-like manner over the working element 2, the bearing element 12 decoupling a rotative rotational movement of the working element 2 about the central axis M relative to the measuring device 10. Furthermore, the bearing element 12 couples the linear movement of the working element 2 to the measuring device 10. The latter is moveable linearly and, coupled to the working element 2, by the lift H, as is indicated in FIG. 1.

For the rotative decoupling of the sleeve-like measuring device 10, the latter is connected to a guide element 13 which merely ensures linear guidance of the measuring device 10 and prevents a rotative movement of the measuring device 10 about the central axis M.

In this connection, the scope of the present invention is also to include allowing the measuring device 10 to engage directly or indirectly in, for example, a radially extending, inner guide groove in the cylinder wall 6 of the housing element 1, if this is desirable. The guide element 13 can then be omitted.

By means of the rotative decoupling of the measuring device 10 relative to the working element 2 and the linear coupling, at least one linear sensor 14, which is preferably arranged on the inside in the housing element 1 on the inner cylinder wall 6 in the vicinity of the base 11, can be used to read and control, in a highly precise manner, a linear movement of the measuring device 10 via sensors 15, for example magnetic strips, encoders, linear sensors or the like, and, as far as the lift is concerned, the linear acceleration and velocity directly.

By this means, a linear movement of the working element 2, in particular also the linear movement, coupled thereto, of the measuring device 10 can be precisely determined and controlled in an absolutely exact manner to a few hundredths of a millimeter, which concerns, in particular, the parameters of the path or lift to be covered, the acceleration and also the velocity.

The measuring device 10 is assigned on the inside a rotation sensor 17 which interacts with a second rotation sensor on that region 16 of the working element 2 which is of tapered design. Said rotation sensors are arranged lying opposite each other. The rotation sensors 17, 18 are arranged in a contactless manner with respect to each other and are linearly moveable.

Viewed rotatively, the rotation sensor 17, which is connected to the measuring device 10 is driven in a fixed manner, and the opposite rotation sensor 18, which is connected to the working element 2, is driven rotatively, by means of the working element 2.

By this means, the rotational movement can be controlled exactly in a defined, determined and, in particular, programmable manner with the aid of the rotative motor 7. For example, a determined, arbitrary number of revolutions of the working element 2 can be read and controlled by means of the rotative motor 7. The angular velocities and also angular accelerations of the working element 2 can also be measured and controlled by means of the rotative motor 7.

In this case, the rotation sensor 18 can comprise individual magnets, resolvers/encoders or the like which do not require any supply of power from the outside.

The supply of power and also the supply and discharge of information and signals takes place via the rotation sensor 17. This is only moved linearly, but not rotatively. A connecting line 19 (only indicated here) also supplies the corresponding signals for the rotative motor 7.

Further connecting lines 20 produce the connection to the linear sensor 14, this connecting line 20 being guided to the outside in the fixed housing element 1. The actual transmission of the information or data of the linear movement takes place in a contactless manner in a similar way to the transmission of data by the rotation sensors 17, 18. These rotation sensors 17, 18 may also be used for starting up the rotative motor 7, and the linear sensor 14 together with interacting magnetic strips 15 may also be used for starting up the linear motor 5.

An exact, contactless measurement of the linear movement and control of the linear movement are only possible, in particular, by decoupling the rotative movement of the measuring device 10. At the same time, an exact measurement and control of the rotative movement of the working element is made possible in a contactless manner independently of the linear movement. Separate protection is therefore sought in the subordinate claims for the decoupling of the measuring device.

Furthermore, it has proven particularly advantageous in the case of the present invention to support the measuring device 10, and therefore the working element 2, relative to a base 11 of the housing element 1 by means of a spring element 21. The spring element 21 can be configured in such a manner that, for example, the dead weight of the working element 2 is completely absorbed. By this means, during the linear movement of the working element 2 and of the measuring device 10 the mass is reduced, so that considerably higher linear accelerations and velocities can be dealt with with great precision.

In addition, wear is minimized, it also being possible for the design of the linear motors 5 to be correspondingly coordinated therewith. Said linear motors may, for example, turn out to be lighter and smaller.

It is also proven advantageous to pass the connecting line 19 to the rotation sensor 17 via the spring element 21 in order to equalize a lift H, without having to correspondingly shorten or extend the connecting line 19.

Furthermore, the spring element 21 ensures a cut-out, for example in the event of a current breakdown, so that a movement of the working element 2 towards the base 11 of the housing element 1 is intercepted and damped without the precise bearings 3 or the components of the measuring device 10 being damaged by an impact or the like or being adversely affected in their accuracy.

In particular by equalizing the dead weight of the working element 2 with, for example, adjoining tool 4 and measuring device 10, great advantages are afforded, in particular, in the linear movement of the working element 2 by means of the linear motor 5, with the result that relatively large accelerations and velocities are possible at a relatively small starting power and relatively small overall size of the linear motor 5. Separate protection is therefore claimed in this regard by the subordinate, further patent claims.

Figure 3:
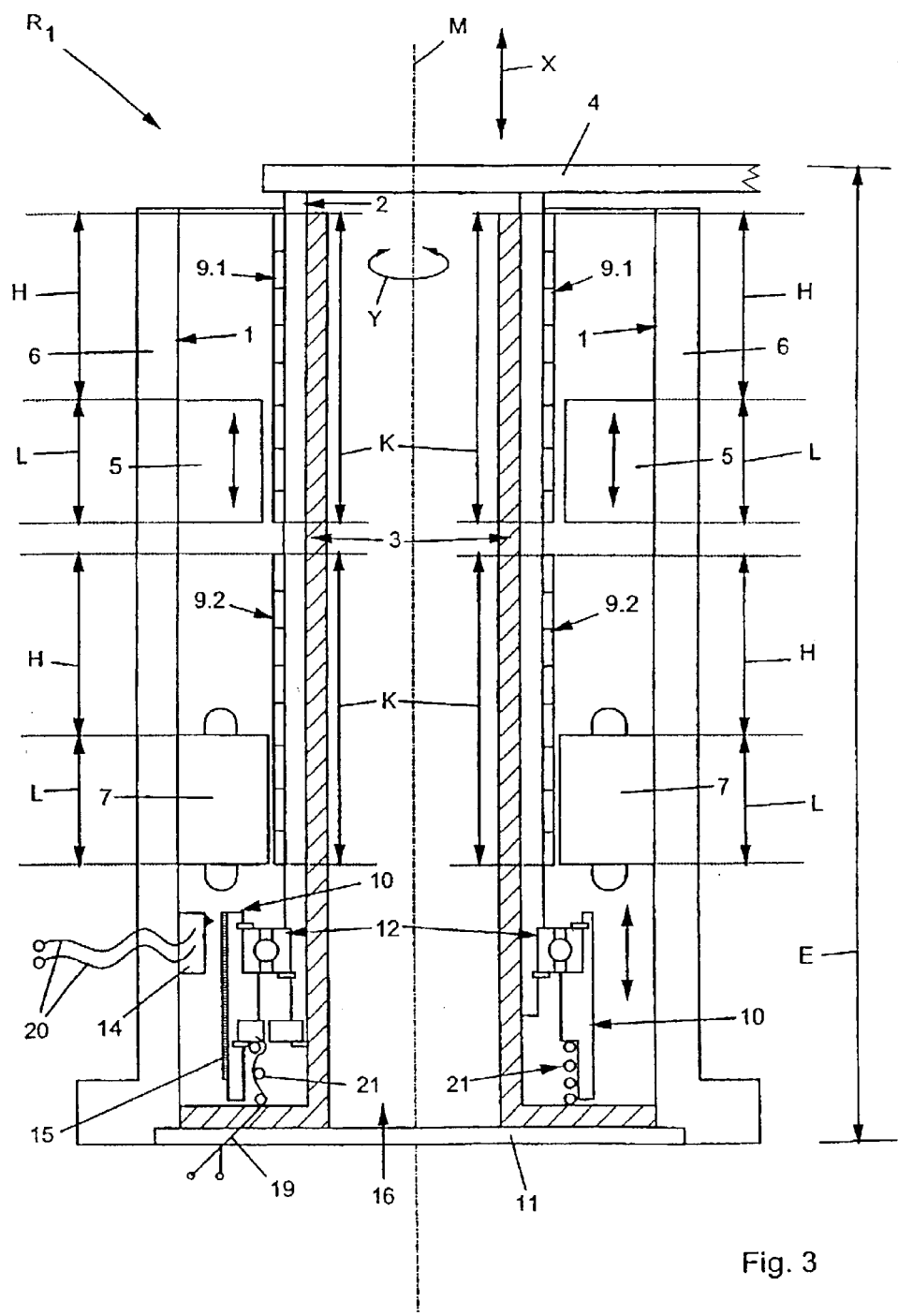
FIG. 3 shows a schematically illustrated longitudinal section of a further exemplary embodiment through the lifting/swiveling drive according to FIGS. 1 and 2.

In a further exemplary embodiment of the present invention according to FIG. 3, a further lifting/swiveling drive R is shown which essentially has the components as are described in FIGS. 1 and 2.

The difference is that the bearing 3 is not arranged between the housing element 1 and working element 2, but is provided within the working element 2. Sliding bearings are preferably also used here. The bearing 3 is supported on the base 11 or in the end region of the housing element 1 or is connected fixedly to the latter. If appropriate, the bearing 3 may be part of the housing element 1 or may be assigned thereto, as indicated in FIG. 3.

By means of the mounting of the working element 2 rotatively about the bearing 3, which is arranged within the working element 2, both in the radial and in the axial direction, a lift H can be increased, or an installation height E can be reduced in comparison with the exemplary embodiment according to FIGS. 1 and 2. This is likewise to lie within the scope of the present invention.

However, the scope of the present invention is also to include, for example, pulling the working element 2 coaxially over the housing element 1, so that then the magnets 9.1, 9.2 are correspondingly provided on an inner wall (not illustrated here in greater detail) of the working element, and the rotative motors 7 and linear motors 5 are correspondingly arranged on an outer cylinder wall of the housing element 1. The invention is not intended to provide any limits in this regard.

List of Reference Numbers

1 Housing element
2 Working element
3 Bearing
4 Tool
5 Linear motor
6 Cylinder wall
7 Rotative motor
8 Circumferential surface
9 Magnet
10 Measuring device
11 Base
12 Bearing element
13 Guide element
14 Linear sensor
15 Magnetic strip
16 Region
17 Rotation sensor
18 Rotation sensor
19 Connecting line
20 Connecting line
21 Spring element
A Distance
E Installation height
H Lift
K Radial length
L Length
M Central axis
R Lifting/swiveling drive
X Double arrow direction
Y Double arrow direction

What is claimed is:

1. Lifting/swiveling drive having a working element (2) which can move rotatably and linearly relative to a housing element (1), characterized in that in order for the working element (2) to move in a controllable, linear and rotative, contactless manner relative to the housing element (1) and in order to measure and/or control a linear movement of a linear motor (5), rotative movement of the working element (2) takes place by means of a rotatively decoupled and linearly coupled measuring device (10), the measuring device being coupled linearly to the linear movement of the working element (2), and characterized in that by rotatively decoupling the measuring device (10) relative to the rotatively and linearly movable working element (2), a permanent, contactless measurement of the rotational movement is ensured by means of rotation sensors (17, 18) which lie opposite each other and spaced apart in a contactless manner between the measuring device (10) and working element (2).

2. Lifting/swiveling drive having a working element (2) which can move rotatably and linearly relative to a housing element (1), characterized in that for the contactless, rotative measurement and/or control of a rotational movement of the working element (2) relative to the housing element (1), a linear movement is coupled by means of a measuring device (10) assigned to the working element (2), the measuring device (10) being rotatively decoupled relative to rotational movement of a rotative motor (7), and being coupled linearly to the linear movement of the working element (2), and characterized in that by rotatively decoupling the measuring device (10) relative to the rotatively and linearly movable working element (2), a permanent, contactless measurement of the rotational movement is ensured by means of rotation sensors (17, 18) which lie opposite each other and spaced apart in a contactless manner between the measuring device (10) and working element (2).

3. Lifting/swiveling drive according to claim 2, characterized in that the working element (2) is connected to the measuring device (10) in a radially movable manner, a linear movement of the working element (2) being coupled to the measuring device (10) via a bearing element (12).

4. Lifting/swiveling drive according to claim 3, characterized in that the measuring device (10) is coupled linearly to the linear movement of the working element (2) and is decoupled with respect to the radial movement of the linear motor (5) in that the latter is in engagement with a guide element (13) of the housing element (1).

5. Lifting/swiveling drive according to claim 4, characterized in that in order for the measuring device (10) to be rotatively decoupled relative to the rotative movement of the working element (2), the latter is guided linearly relative to the housing element (1).

6. Lifting/swiveling drive having a working element (2) which can move rotatably and linearly relative to a housing element (1), characterized in that for the contactless, rotative measurement and/or control of a rotational movement of the working element (2) relative to the housing element (1), a linear movement is coupled by means of a measuring device (10) assigned to the working element (2), the measuring device (10) being rotatively decoupled relative to rotational movement of a rotative motor (7), and being coupled linearly to the linear movement of the working element (2), characterized in that the working element (2) is connected to the measuring device (10) in a radially movable manner, a linear movement of the working element (2) being coupled to the measuring device (10) via a bearing element (12), characterized in that the measuring device (10) is coupled linearly to the linear movement of the working element (2) and is decoupled with respect to the radial movement of the linear motor (5) in that the latter is in engagement with a guide element (13) of the housing element (1), characterized in that in order for the measuring device (10) to be rotatively decoupled relative to the rotative movement of the working element (2), the latter is guided linearly relative to the housing element (1), and characterized in that by rotatively decoupling the measuring device (10) relative to the rotatively and linearly movable working element (2), a permanent, contactless measurement of the rotational movement is ensured by means of rotation sensors (17, 18) which lie opposite each other and spaced apart in a contactless manner between the measuring device (10) and working element (2).

7. Lifting/swiveling drive according to claim 6, characterized in that independently of a linear movement of measuring device (10), coupled to the linear movement of the working element (2), by means of rotative decoupling of the measuring device (10) relative to the rotative movement of the working element (2) the rotational movement, a rotational acceleration, an exact measurement of the rotational angle can be detected in a contactless manner by means of rotation sensors (17, 18) and can be measured and evaluated in particular for controlling the rotative motor (7).

8. Lifting/swiveling drive according to claim 7, characterized in that in order to measure and control the linear movement of the working element (2) relative to the housing element (1), the latter is assigned a linear sensor (14) in contactless connection with the one sensor (15), encoder strip or magnetic strip of the working device (2), in particular measuring device (1).

9. Lifting/swiveling drive according to claim 8, characterized in that the linear sensor (14) is arranged in a fixed manner within the housing element (1) and, in the vicinity of the measuring device (10), interacts in a contactless manner with the encoder strip, magnetic strip (15) or the like of the measuring device (10) for the exact and precise determination of a lift (H) and of a linear acceleration or velocity.

\* \* \* \* \*